(12) United States Patent
Firmin et al.

(10) Patent No.: US 7,104,121 B2
(45) Date of Patent: Sep. 12, 2006

(54) VALVE SEAT GAUGING SYSTEM

(75) Inventors: Glenn Firmin, Strortsford (GB); Paul Garland, Romford (GB); Mark Sutton, Cheshunt (GB); Erdogan Zor, Enfield (GB)

(73) Assignee: Fenn Engineering Limited, (GB)

( * ) Notice: Subject to any disclaimer, the term of this patent is extended or adjusted under 35 U.S.C. 154(b) by 0 days.

(21) Appl. No.: 11/114,375

(22) Filed: Apr. 26, 2005

(65) Prior Publication Data

US 2005/0279159 A1   Dec. 22, 2005

(30) Foreign Application Priority Data

Apr. 26, 2004   (GB) ................................. 0409243.3

(51) Int. Cl.
*G01M 15/00*   (2006.01)
(52) U.S. Cl. .................................. 73/119 R
(58) Field of Classification Search ................. 73/116, 73/117.2, 117.3, 118.1, 119 A, 119 R, 47, 73/49.7, 118.2, 49.6, 49.8
See application file for complete search history.

(56) References Cited

U.S. PATENT DOCUMENTS

| | | | | |
|---|---|---|---|---|
| 4,034,478 A | * | 7/1977 | Yager ........................... | 33/611 |
| 4,178,115 A | * | 12/1979 | Pool ............................. | 408/82 |
| 4,372,023 A | * | 2/1983 | Castoe ......................... | 29/256 |
| 5,533,384 A | * | 7/1996 | Pierce et al. .................... | 73/47 |
| 5,613,809 A | * | 3/1997 | Harmand et al. ........... | 408/1 R |
| 5,704,741 A | * | 1/1998 | Cirino ......................... | 408/146 |
| 6,205,850 B1 | * | 3/2001 | Wehrman et al. .......... | 73/119 R |
| 6,647,770 B1 | * | 11/2003 | Satish et al. ............... | 73/119 R |
| 6,973,905 B1 | * | 12/2005 | Hathaway et al. ....... | 123/90.45 |
| 2003/0010103 A1 | * | 1/2003 | Satish et al. ............... | 73/118.1 |
| 2005/0098125 A1 | * | 5/2005 | Hathaway et al. .......... | 123/90.1 |
| 2005/0205035 A1 | * | 9/2005 | Hathaway et al. ....... | 123/90.52 |

FOREIGN PATENT DOCUMENTS

| | | |
|---|---|---|
| EP | 1052472 A3 | 11/2002 |
| GB | 1122916 A | 8/1968 |

\* cited by examiner

*Primary Examiner*—Eric S. McCall
(74) *Attorney, Agent, or Firm*—Arnold B. Silverman; Eckert Seamans Cherin & Mellott, LLC

(57) ABSTRACT

A gauging system for checking a valve seat and a valve guide of an engine part, the system comprising:
  a gauge support mountable to a stable platform;
  a gauge which, in use, depends from the gauge support and has a gauge head for seating on the valve seat and insertion into the valve guide;
  a balancing mechanism to seat the gauge on the valve seat with a predetermined load, the valve seat providing the datum for the gauge;
  a motor to rotate the gauge head with respect to the valve seat and valve guide.

13 Claims, 6 Drawing Sheets

VALVE SEAT GAUGING SYSTEM

This invention relates to a valve seat gauging system and more particularly to a valve seat gauging system for checking the valve seats in the cylinder head of an engine block.

The flow of gases in and out of a combustion engine is controlled by valves which open and close inlet and exhaust ports in a cylinder head. A valve seat comprises a tapered circular hole onto which the similarly tapered surface of the valve makes a sealing contact. With each valve seat there is an associated valve guide to guide the reciprocating motion of the valve—see FIGS. 1 and 2 of the accompanying drawings.

The cylinder head is a cast part which is then machined. The valve guides and valve seats are provided as inserts in the machined cylinder head and are then themselves also machined, a single cutting tool is usually used to machine the inner surfaces of both the valve seat and the associated valve guide. It is important to ensure uniformity between the valve seats and valve guides and maintain the close tolerances specified by manufacturers to ensure proper sealing of the valve and to minimise wear.

Referring to FIG. 1 of the accompanying drawings, the two inserts comprising the valve seat and the valve guide are shown together with their gauge lines—the lines at which a gauge inserted in the valve seat and valve guide would make measurements to check the machining of the valve seat and the valve guide.

Preferably, an air gauge is used to determine the clearance between the air gauge and the internal surfaces of the valve seat and/or associated valve guide so as to check the tolerances of the valve seat and the valve guide at the gauge lines. Other forms of gauge may also be used.

Prior Gauging Systems Involve Three Basic Types of Gauge:

(1) A manual gauge in which the gauge is inserted in the valve seat and guide and rotated in the valve seat in increments to take measurements of the clearance. This suffers from inaccuracies because the manner in which the gauge is handled will affect the measurements. Even if the gauge itself is accurate, the operator (or indeed different operators) will affect how readings are taken leading to inaccuracies.

(2) A motorised gauge in which the air gauge is provided with a handle housing a motorised drive to turn the air gauge in the valve seat. The gauge is seated and held in the valve seat manually so this also introduces errors.

(3) A datum plate having a sleeve aligned with a valve seat below the datum plate. The sleeve receives the gauge and accurately positions the gauge over and into the valve seat. The datum plate must be accurately manufactured and there must be careful registration of the sleeve(s) with each of the valve seats. Any misalignment of the datum plate with respect to the cylinder head will affect the accuracy of the gauge readings. This arrangement represents, therefore, an expensive infrastructure within which the gauge is to be used. For each cylinder head, a distinct datum plate must be provided and accurate registration holes maintained in the cylinder head to which the datum plate is attached. An example of this complex system is described in U.S. Pat. No. 5,533,384.

It is an object of the present invention to seek to provide a valve seat gauging system which does not suffer from the above-mentioned drawbacks and which is both simple and accurate.

In order that the present invention may be more readily understood, embodiments thereof will now be described, by way of example, with reference to the accompanying drawings, in which.

Figure 1:
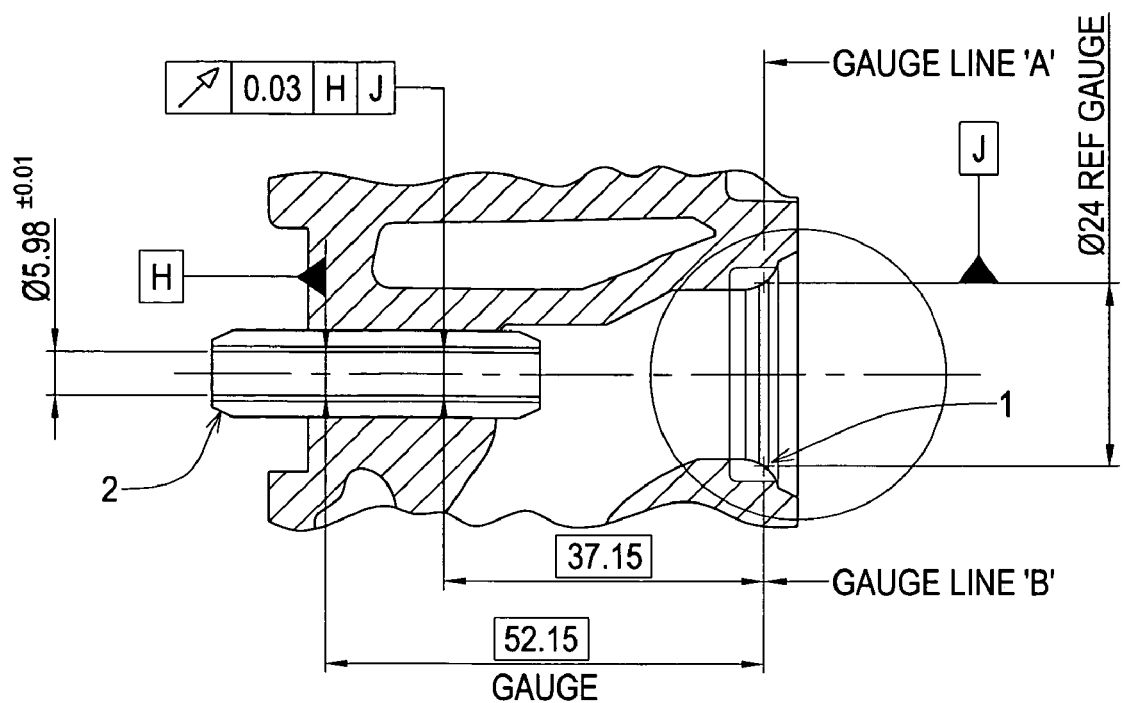
FIG. 1 is a partial cross-section through a part of a cylinder head showing a valve seat and its associated valve guide.
Figure 2:
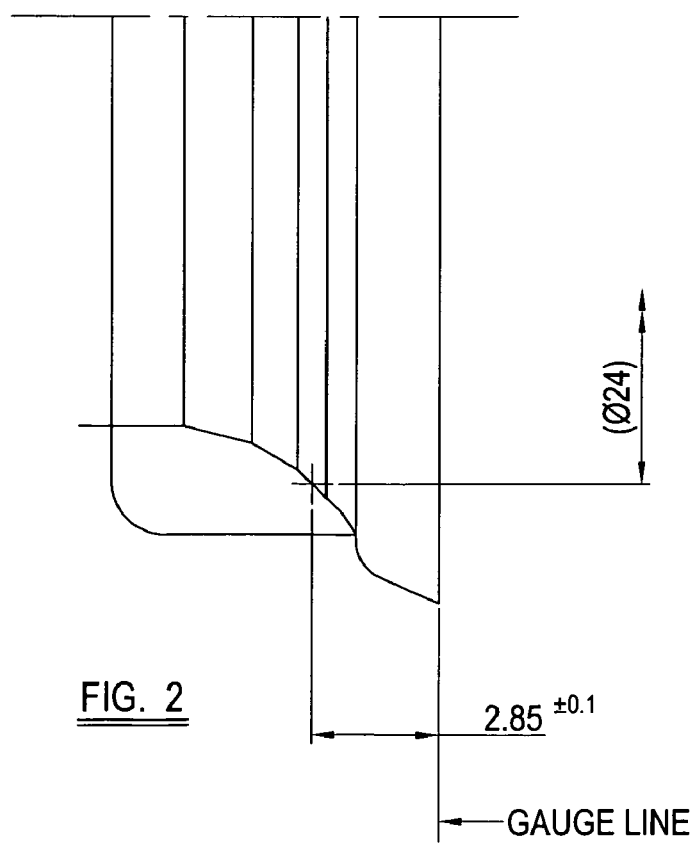
FIG. 2 is a detail showing the profile of the valve seat of FIG. 1.

Referring to FIGS. 1 and 2, a valve seat 1 and its associated valve guide 2 are provided as inserts in a cylinder head 3 only part of which is shown in FIG. 1. FIG. 2 is a detail of the profile of the inner surface of the valve seat 1. In FIG. 1, it will be seen that there are two gauge lines A and B at which measurements are to be made with an air gauge of the inner surface of the valve seat 1 and its associated valve guide 2 to check the accuracy with which the valve seat and its associated valve guide have been machined. The runout is also measured between line H in the valve guide and line J in the valve seat.

Figure 3:
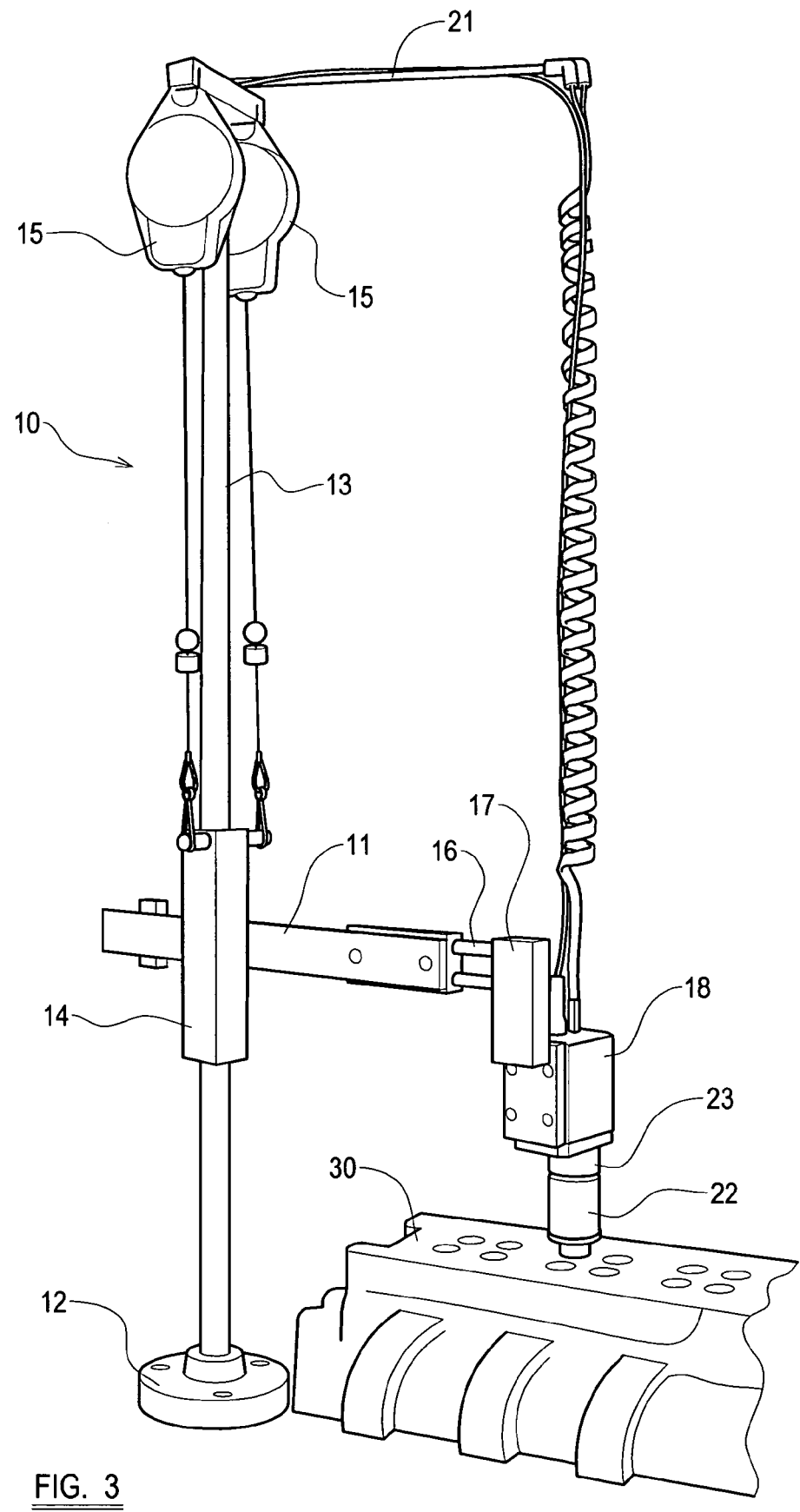
FIG. 3 is a schematic perspective view of a gauging system embodying the present invention with the gauge thereof seated in a valve seat of a cylinder head.

Referring now to FIG. 3, a cylinder head 30 typically has a plurality of cylinders each of which is provided with inlet and outlet valves. In FIG. 3, part of the cylinder head 30 is shown in which twelve of the valve seats 1 are visible, one of the twelve being obscured by a gauge 22 which is inserted in that valve seat. The gauge is part of a valve seat gauging system 10 embodying the present invention.

Figure 4:
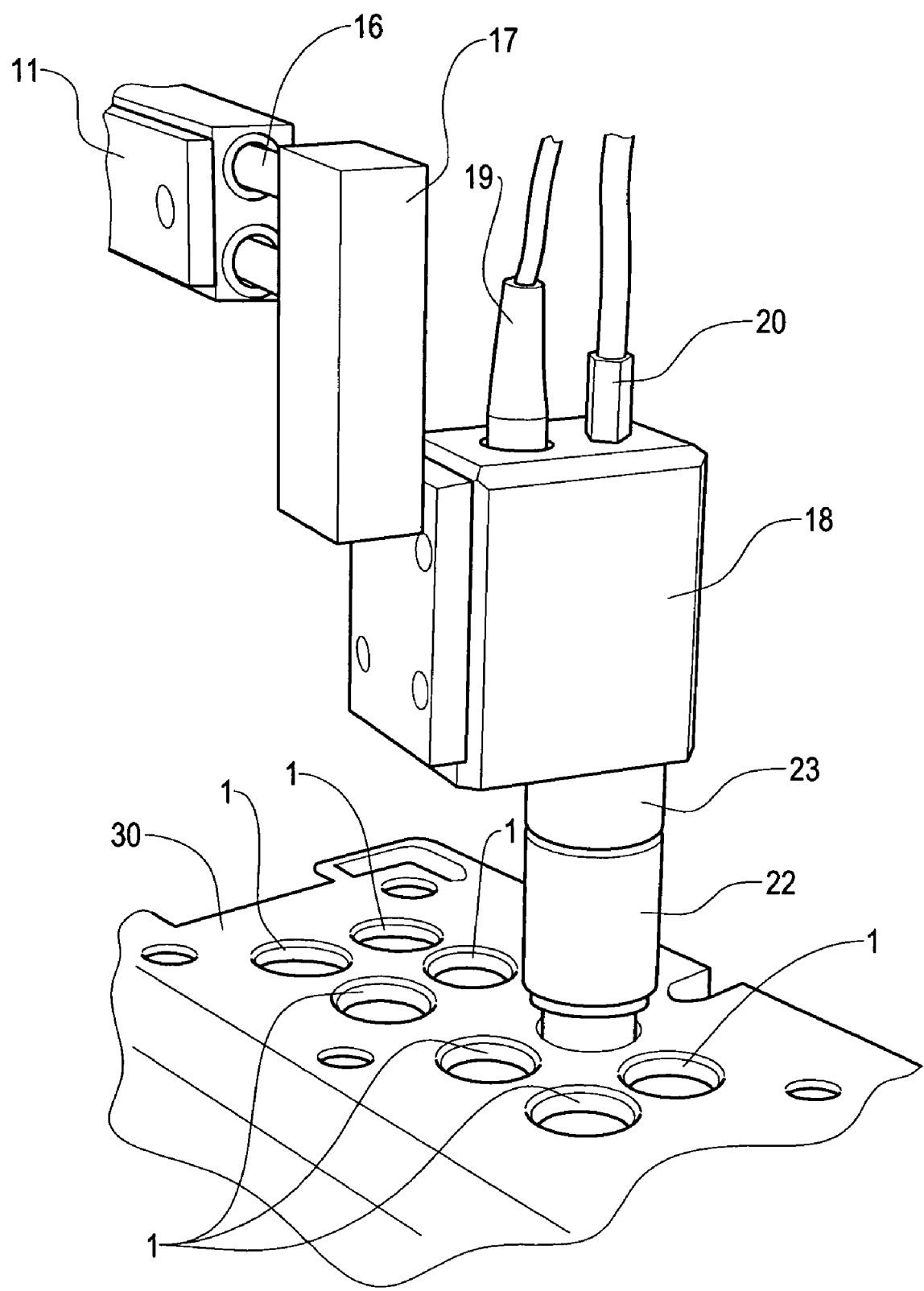
FIG. 4 is a detail of FIG. 3 showing the gauge seated in one of a number of valve seats in the cylinder head.

The gauging system 10 includes a free-standing balancing arm 11, having a base 12, an upright column 13 around which is located a slidable bush 14 suspended from a pair of tensators 15 fixed at the top of the column 13. The testators 15 are calibrated such that the balancing arm 11 which is rigidly attached to the slidable bush 14, exerts a pre-determined load (as will be explained below). The balancing arm 11 has a pair of telescopic arms 16 to which a mounting plate 17 is attached, allowing lateral extension or retraction of the mounting plate 17, with respect to the balancing arm 11. As previously mentioned, the slidable bush 14 allows movement vertically and also permits rotational movement around the column 13. Thus, the mounting plate 17 is able to move in all three dimensions whilst only exerting a pre-determined load as determined by the calibrated tensators 15. A load in the region of 2 to 30N has been found to provide good results. A preferred load is 10N. Such balancing arms are commercially available items. A gauge support 18 is mounted to the mounting plate 17 and houses a motor drive unit and compressed air ports which are best seen in FIG. 4. Cables and lines for an electrical supply 19 and a compressed air supply 20 are held above the gauge support 18 by a cantilevered arm 21 which is rigidly connected to the top of the column 13. The gauge support 18 is therefore substantially de-coupled from any forces except the pre-determined load which its weight and the weight of the balancing arm components exert on the engine part located under the gauge support 18 as compensated by the tensators 15.

In FIG. 4, a gauge 22 depends from the gauge support 18. Preferably, an air gauge is used to determine the clearance between the air gauge and the internal surfaces of the valve seat and/or associated valve guide so as to check the tolerances of the valve seat and the valve guide at the gauge lines. Other forms of gauge may also be used. A universal joint mechanism 23 is interposed between the gauge and the gauge support 18 so as to accommodate any slight misalignment of the gauge support 18 with respect to the valve seat in which the gauge 22 is to be inserted. The universal joint mechanism 23 will accommodate an angular movement in the order of ±2° and allows the gauge 22 to hang substantially vertically for registration in the valve seat(s) therebelow. The valve seats are also arranged to be oriented vertically.

Figure 5:
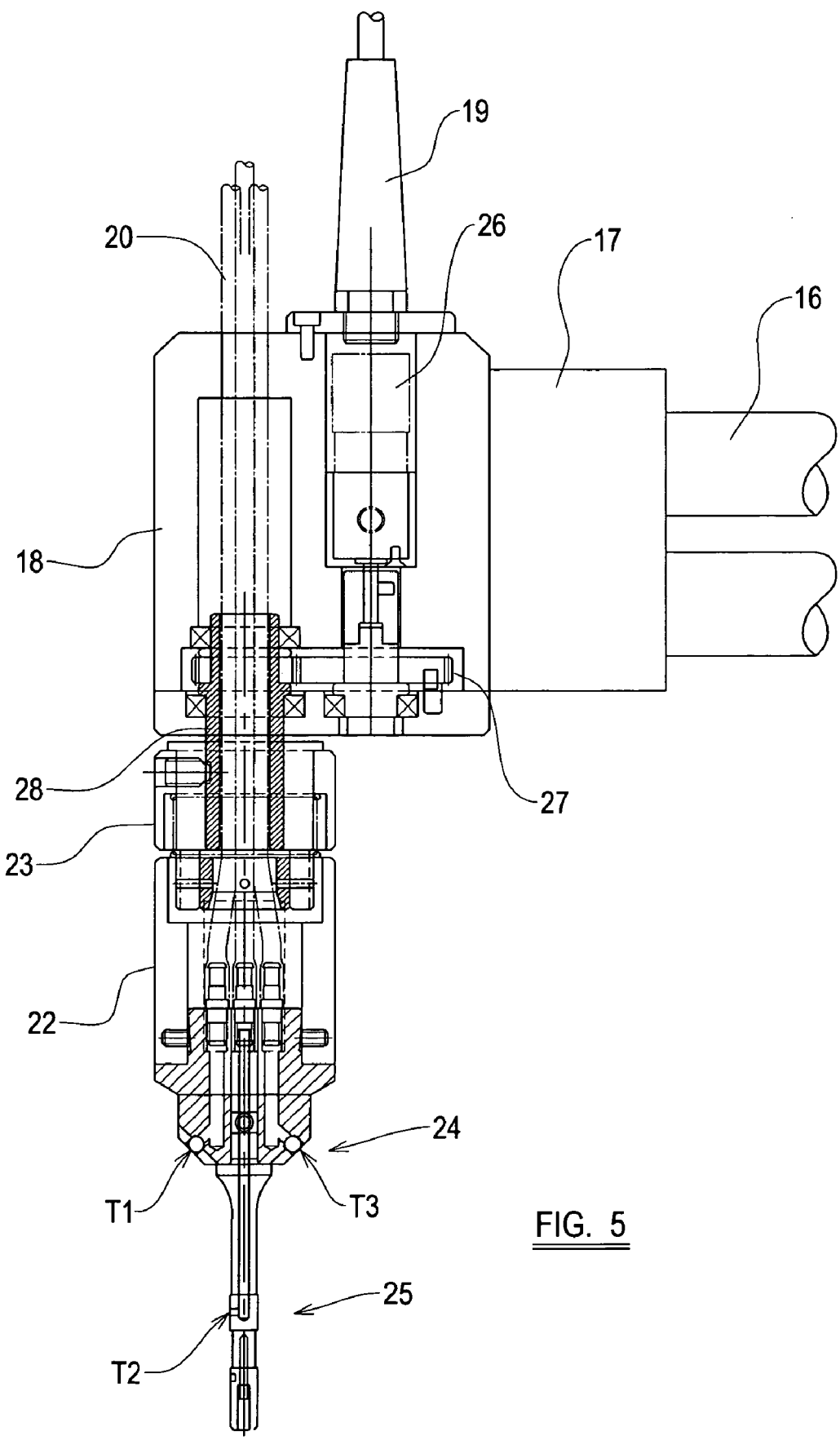
FIG. 5 is a cross-section through a part of a gauging system embodying the present invention.

Referring now to FIG. 5, the air gauge 22 is of conventional design having two sets of air jets 24, 25. The first set of air jets 24 are located at the root of the gauge head so as to measure the roundness and ovality of the valve seat in which they are located and the second set of air jets 25 are located in the tip of the air gauge to determine the runout of the valve guide in which it is inserted.

A motor 26 is located in the gauge support 18, and drives a gearbox 27 also located in the gauge support 18. The gearbox drivingly engages to a gauge shaft 28 from which the universal joint 23 and the gauge 22 depend. Both the universal joint 23 and the gauge 22 rotate when the gauge drive shaft 28 is rotated. The air supplies 20 for the air jets 24, 25 are fed through the gauge drive shaft 28, which is hollow, to the gauge 22.

A cylinder head 30 which is best seen in FIG. 4, is shown schematically having, in FIG. 4, seven valve seats 1 visible and one valve seat obscured by the gauge 22 which is inserted therein.

The cylinder head 30 is held in a jig or otherwise supported such that the valve seats 1 and their associated valve guides 2 are vertical—that is the central axis through the valve seats 1 and valve guides 2 is vertical. Likewise, the gauge 22 depends vertically from the gauge support 18.

The gauge support 18 is movable in all three dimensions and so can be readily manoeuvred above the cylinder head 30 and positioned so as to align the gauge 22 with any of the valve seats 1 lying underneath the gauge support 18.

The air gauge 22 is substantially conventional apart from one feature which is the provision of two air jets diametrically opposite one another in the set of air jets 24 for checking the valve seat 1. By providing two diametrically opposed air jets 24, the ovality of the valve seat can be checked.

It will be appreciated from FIG. 5, that the reading from each of the air jets 24, 25 is designated respectively T1, T2 or T3. This allows the following measurements to be made:

Roundness=max(0−$T1$)−min(0−$T1$);

Ovality=max((0−$T1$)+(0−$T2$))−min((0−$T1$)+(0−$T2$)); and

Valve guide runout=max(0−$T3$)−min(0−$T3$))

The relationship between clearance between the air gauge air jets 24, 25 and the inner surfaces of the valve seat 1 and the associated valve guide 2 is determined in advance of any measurements by placing the air gauge 22 in a setting master valve seat and associated valve guide so as to provide a measure against which all gauge measurements are compared. The relationship between air pressure and clearance is determined from measurements taken whilst the air gauge is seated in the setting master to provide a look-up conversion rate between milibars of pressure experienced by the air jets and a clearance in microns for each of the air jets 24, 25.

The free-standing balancing arm means that the gauging system can be set up readily in a workplace in any number of possible positions around the workpiece in this case, a cylinder head 30. The free standing balancing arm provides a stable platform and does not need to be in contact with the cylinder head 30 or any datum on the cylinder head 30. When seated in a valve seat, the air gauge 22 is seated with a pre-determined load determined by the tensators 15 and takes the valve seat 1 as its datum for the gauge readings.

Figure 7:
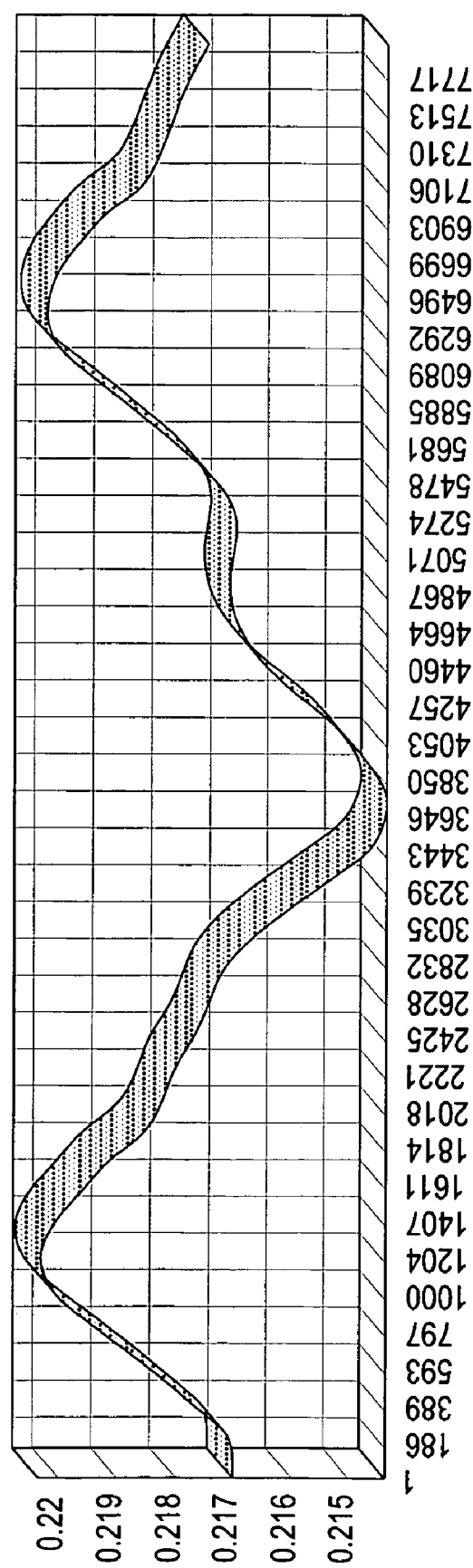
FIG. 7 is a graphical representation of a typical reading from the gauge of a gauging system embodying the present invention.

In operation, the gauge support 18 is held by an operator and moved into position over a first valve seat to be checked and the gauge support 18 lowered until the gauge 22 is inserted in the valve seat 1. The operator then releases the gauge support 18 and initiates the measurement procedure. The measurement procedure involves the supply of a controlled compressed air supply to the air jets 24, 25 and a rotation of at least 360° of the gauge 22 in the valve seat 1 to be checked. As the gauge 22 is rotated in the valve seat 1, readings of the air pressure to determine the clearance are streamed from the gauge 22 and stored in a computer and can be displayed graphically as shown in FIG. 7. Rotation of the gauge 22 and the valve seat 1 is preferably undertaken over more than 360° in order that there is some overlap of the readings around the valve seat to ensure that the measurements from the gauge have reached a stable state.

After completion of rotation of the gauge 22 in the valve seat 1, the measurement cycle for that valve seat is over, the gauge is reset and the operator can then grasp the gauge support 18 again, lift the gauge 22 out of the valve seat 1 by pulling the gauge support 18 vertically upwards and then manoeuvring the gauge support 18 over the next valve seat 1 to be measured and lowering the gauge 22 into that next valve seat whereupon the measurement operation is commenced again and the readings recorded appropriately.

It will be appreciated that there is no operator manual intervention during the measurement procedure so the readings are extremely repeatable. An example of a gauge capability calculation worksheet for a gauging system embodying the present invention is given over the page.

Gauge capability worksheets are commonly used to determine the repeatability and reproducibility of gauge readings and to determine whether or not the gauge itself is capable of making measurements to a desired accuracy. The consistently applied pre-determined load and the total lack of operator involvement during the measurement cycle greatly contribute to the extremely good capability of the gauging system 10 embodying the present invention.

The provision of a universal joint mechanism 23 to allow limited play of the gauge 22 below the gauge support is also very advantageous and allows the gauge 22 to take the valve seat as its datum for the subsequent measurements.

Figure 6:
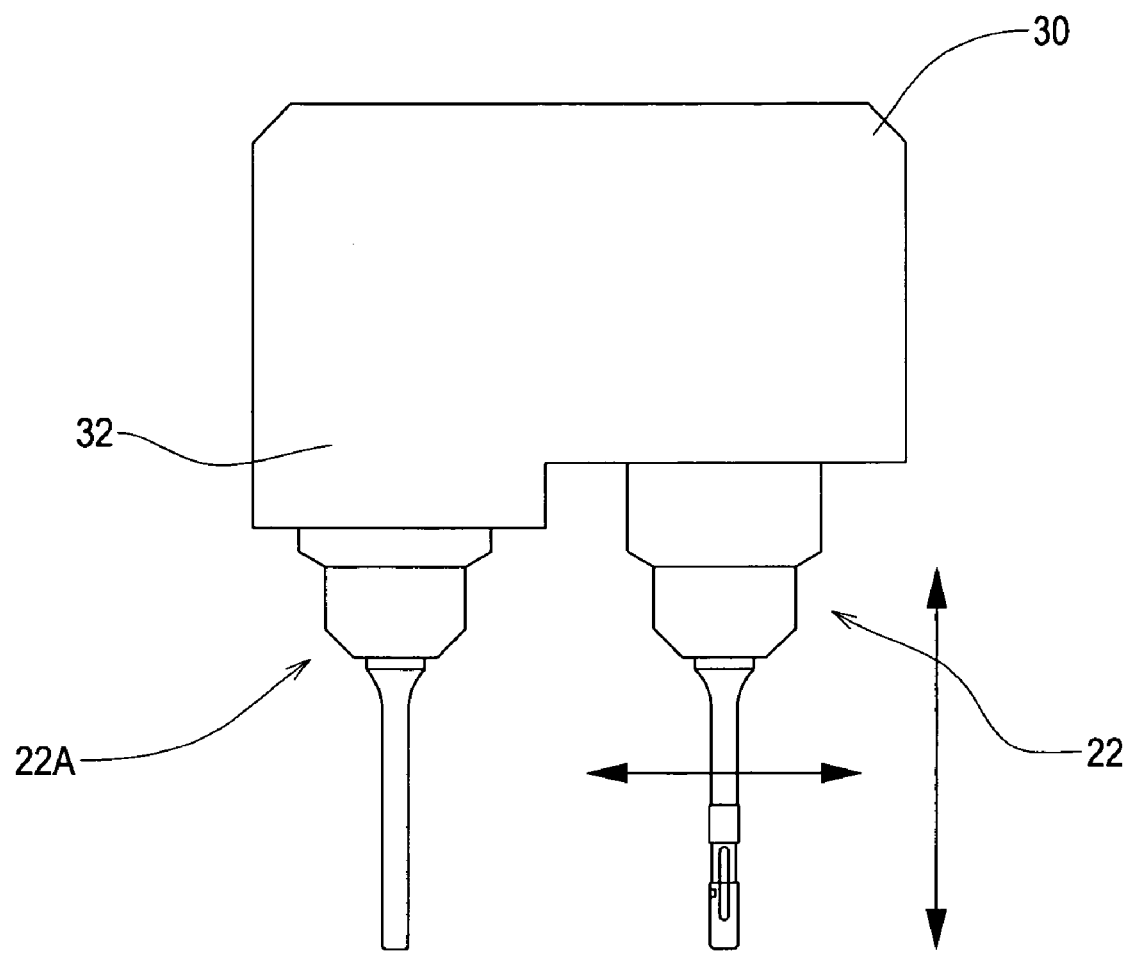
FIG. 6 is a schematic side view of a gauging system embodying a second aspect of the present invention.

In another embodiment of the present invention shown in FIG. 6, the gauge, universal joint mechanism and gauge support are substantially identical to the previously described embodiment but the embodiment shown in FIG. 6 does not use a free-standing balancing arm. Instead, this embodiment takes advantage of the fact that cylinder heads have a plurality of valve seats 1 thereon which usually come in adjacent pairs having the same orientation. Either a further gauge head 22, or an article having the same form as a gauge head 22, is provided (a driving gauge head). In FIG.

6, the further gauge head or the article having the same form as a gauge head is designated with reference numeral 22A and will hereinafter be referred to as the second gauge head. Like the gauge head of the gauge 22, the second gauge head 22A is also detachable so that different forms of gauge head can be used for different shaped valve seats and valve guides.

The gauging system has a main body 30, in which is housed an adjustable balancing mechanism having the same function as the previously described balancing arm. From the balancing mechanism depends the gauge support and the gauge. It would be readily apparent to a person of ordinary skill in the art how to implement a suitable balancing mechanism. A locating arm 32 is integrally formed with the main body 30 (or fixedly attached thereto) and depends downwardly from the main body 30 substantially parallel to the gauge 22 and terminates in the second gauge head 22A. The second gauge head 22A is releasably attachable to the locating arm 32. The second gauge head 22A and the gauge head of the gauge 22, are therefore adjacent one another but importantly the gauge 22 is decoupled from the main body 30 of the gauging system and therefore only experiences the predetermined load set by the balancing mechanism in the main body 30, when the gauging system is in use. A universal joint arrangement may also be interposed between the gauge head 22 and the main body 30.

In use, the gauging system of FIG. 6 is lowered onto a cylinder head 30, such that the second gauge head 22A is located in a valve seat 1, and the gauge head of the "real" gauge 22, is located in an adjacent valve seat 1 to be checked. The second gauge head sits in the second valve seat and is inserted into the second valve guide and therefore provides a stable platform such that the gauge 22 only experiences, in use, and during the measurement operation, the predetermined load set by the balancing mechanism 31. The measurement operation is identical to the measurement operation described before in relation to the previous embodiment.

This example of the invention provides a most compact and simple form of gauging system.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A gauging system for checking a valve seat and a valve guide of an engine part, the system comprising:

a gauge support mountable to a stable platform;

a gauge which, in use, depends from the gauge support and has a gauge head for seating on the valve seat and insertion into the valve guide;

a balancing mechanism to seat the gauge on the valve seat with a predetermined load, the valve seat providing the datum for the gauge;

a motor to rotate the gauge head with respect to the valve seat and valve guide.

2. A system according to claim 1, wherein the gauge is connected to the gauge support by a universal joint.

3. A system according to claim 1, wherein the motor is mounted on the gauge support to drive a drive shaft attached to the gauge head.

4. A system according to claim 1, wherein the balancing mechanism comprises a balancing arm mounted remote from the engine part.

5. A system according to claim 1, wherein the only part of the gauging system in contact with the engine part comprises the gauge head seated on the valve seat and in the valve guide.

6. A system according to claim 1, wherein the engine part is mounted on a jig so as to present the or each valve seat and valve guide substantially vertically to the gauge and gauge head depending from the gauge support.

7. A system according to claim 6, wherein the balancing mechanism is mounted to the jig.

8. A system according to claim 1, wherein a further gauge head for seating, in use, on a second valve seat and insertion into a second valve guide of the same engine part provides the stable platform whilst the first gauge head is seated on the first valve seat and inserted in the first valve guide, the balancing mechanism being located between the further gauge head and the gauge support.

9. A system according to claim 1, wherein an article having the form of a gauge head for seating, in use, on a second valve seat and inserting into a second valve guide of the same engine part provides the stable platform whilst the first gauge head is seated on the first valve seat and inserted in the first valve guide, the balancing mechanism being located between the article having the form of a gauge head and the gauge support.

10. A system according to claim 1, wherein the balancing mechanism is adjustable to set the predetermined load.

11. A system according to claim 1, wherein the predetermined load is in the order of 2 to 30N.

12. A system according to claim 1, wherein the predetermined load is in the order of 10N.

13. A system according to claim 1, wherein the gauge is an air gauge.

* * * * *